US005475995A

United States Patent [19]
Livingston

[11] Patent Number: 5,475,995
[45] Date of Patent: Dec. 19, 1995

[54] TRUCK SPARE TIRE LOCKING ROD

[76] Inventor: George G. Livingston, 5661 Tica Ave., Dayton, Ohio 45424

[21] Appl. No.: 243,194

[22] Filed: May 16, 1994

[51] Int. Cl.[6] ..................................................... E05B 65/12
[52] U.S. Cl. ................................ 70/259; 70/14; 70/203; 224/42.23; 414/463
[58] Field of Search ........................... 70/201–203, 209, 70/237, 225, 226, 259, 260, 14, 18, 19, 238; 414/463; 224/42.06, 42.23–42.3, 42.41

[56] References Cited

U.S. PATENT DOCUMENTS

| | | | |
|---|---|---|---|
| 1,131,720 | 3/1915 | McCray | 70/203 |
| 1,305,316 | 8/1920 | Kemmling | 70/203 |
| 2,969,993 | 1/1961 | Jasper | 70/203 |
| 3,550,409 | 12/1970 | Pariser | 70/203 |
| 4,522,325 | 6/1985 | McMillan | 224/42.23 X |
| 4,526,021 | 7/1985 | Princell | 70/259 X |
| 4,765,164 | 8/1988 | Prince, Jr. | 414/463 X |
| 4,988,023 | 1/1991 | Heathcoat | 414/463 X |
| 5,330,313 | 7/1994 | Easterwood | 414/463 |
| 5,343,722 | 9/1994 | Richardson | 70/14 X |

Primary Examiner—Peter M. Cuomo
Assistant Examiner—Suzanne L. Dino

[57] ABSTRACT

A new and improved spare tire locking rod for a truck prevents rotation of a rotatable shaft which controls motion of a hoisting assembly for lifting and lowering the spare tire so that the spare tire can be removed and replaced. The apparatus includes a first end assembly which includes a first noncircular inner portion and a second noncircular inner portion connected to the first noncircular inner portion. A midportion is connected to the first end assembly. A second end assembly is connected to the midportion. The second end assembly includes a lock-receiving portion which is capable of receiving a lock assembly for preventing the second end assembly and the midportion from being disconnected from the fixed portion of the truck. The lock-receiving portion of the second end assembly is an aperture.

6 Claims, 2 Drawing Sheets

TRUCK SPARE TIRE LOCKING ROD

BACKGROUND OF THE INVENTION

1. Field of the Invention

The present invention relates generally to locking devices for preventing theft of property associated with a truck and, more particularly, to devices especially adapted to prevent theft of a spare tire from a truck.

2. Description of the Prior Art

In certain trucks, especially certain pickup trucks, a spare tire is carried under the bed of the pickup truck. The spare tire is retained by a bracket that can be lowered or raised by a hoist. The hoist has a rotatable member, such as a rotatable shaft, that is rotated in one direction to lower the spare tire and that is rotated in the opposite direction to elevate the spare tire. Such conventional spare tire retention devices have a disadvantage wherein they are vulnerable to unauthorized operation resulting in theft of the spare tire. In this respect, it would be desirable if a security device were provided which prevented unauthorized use of a spare tire retention device and prevented theft of the spare tire.

In the vicinity of a rotatable shaft used to raise and lower the spare tire retention bracket, there are numerous stationary portions of the truck that may be employed to help arrest motion of the rotatable shaft. In this respect, it would be desirable if a device for preventing theft of a spare tire were provided which utilized a stationary portion of the truck to help arrest motion of the rotatable shaft which is used to raise and lower the spare tire retention assembly.

When devices include locks for providing security, a choice can be made between using built-in locks or using portable padlocks. Built-in locks require careful attention to be paid to the region which receives the lock:. In the case of a retrofitted securing device for a spare tire retention assembly, no lock receiving area would have been initially designed into the construction of the spare tire retention assembly. In this respect, it would be desirable if a device for preventing theft of a spare tire were provided which employed a portable padlock for providing security against theft of the spare tire.

Some locking devices employ large numbers of moving parts that interact in complex ways. Such complex devices are undesirable both because of their relatively high cost and because of their potential for breakdown and failure. In this respect, it would be desirable if a device for preventing theft of a spare tire were provided which was simple in structure and includes no moving parts.

There are a wide variety of trucks on the road that have flat beds. Trucks vary widely in their size and shape and in the spatial relationships between their component parts. For example, the spatial relationship between a rotatable shaft for rotating a spare tire hoist and a fixed frame member for the truck may vary widely from one truck to another.

In normal use, the rotatable shaft for the hoist assembly for the spare tire retention assembly must be turned by some sort of cranking device when the spare tire retention assembly is raised and lowered.

In view of the discussion provided above, it would be desirable if a truck spare tire locking rod would have the following combination of desirable features: (1) prevents unauthorized use of a spare tire retention device and prevents theft of the spare tire; (2) utilizes a stationary portion of the truck to help arrest motion of the rotatable shaft which is used to raise and lower the spare tire retention assembly; (3) employs a portable padlock for providing security against theft of the spare tire; and (4) is simple in structure and includes no moving parts. The foregoing desired characteristics are provided by the unique truck spare tire locking rod of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved spare tire locking rod for a truck which prevents rotation of a rotatable shaft which controls motion of a hoisting assembly which is used for lifting and lowering the spare tire so that the spare tire can be removed and replaced. The apparatus includes a first end assembly which includes a first noncircular inner portion and a second noncircular inner portion connected to the first noncircular inner portion. A midportion is connected to the first end assembly. The midportion is adapted to be connected to a fixed portion of the truck. A second end assembly is connected to the midportion. The second end assembly includes a lock-receiving portion which is capable of receiving a lock assembly for preventing the second end assembly and the midportion from being disconnected from the fixed portion of the truck. The first noncircular inner portion of the first end assembly is connected to the second noncircular inner portion of the first end assembly by a curved connection member.

The rotatable shaft includes a noncircular portion adapted to be straddled by the first end assembly. The noncircular portion of the rotatable shaft includes flat planar surfaces. The first noncircular inner portion and the second noncircular inner portion of the first end assembly also include flat planar surfaces. The midportion of the apparatus is in the form of a straight shaft.

The lock-receiving portion of the second end assembly is an aperture. The fixed portion of the truck is a frame member of the truck. The lock assembly is comprised of a padlock assembly.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least one preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved truck spare tire locking rod which has all of the advantages of the prior art and none of the disadvantages.

It is another object of the present invention to provide a new and improved truck spare tire locking rod which may be easily and efficiently manufactured and marketed.

It is a further object of the present invention to provide a new and improved truck spare tire locking rod which is of durable and reliable construction.

An even further object of the present invention is to provide a new and improved truck spare tire locking rod which is susceptible of a low cost of manufacture with regard to both materials and labor, and which accordingly is then susceptible of low prices of sale to the consuming public, thereby making such truck spare tire locking rod available to the buying public.

Still yet a further object of the present invention is to provide a new and improved truck spare tire locking rod which prevents unauthorized use of a spare tire retention device and prevents theft of the spare tire.

Still another object of the present invention is to provide a new and improved truck spare tire locking rod that utilizes a stationary portion of the truck to help arrest motion of the rotatable shaft which is used to raise and lower the spare tire retention assembly.

Yet another object of the present invention is to provide a new and improved truck spare tire locking rod which employs a portable padlock for providing security against theft of the spare tire.

Even another object of the present invention is to provide a new and improved truck spare tire locking rod that is simple in structure and includes no moving parts.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

With reference to the drawings, a new and improved truck spare tire locking rod embodying the principles and concepts of the present invention will be described.

Figure 1:
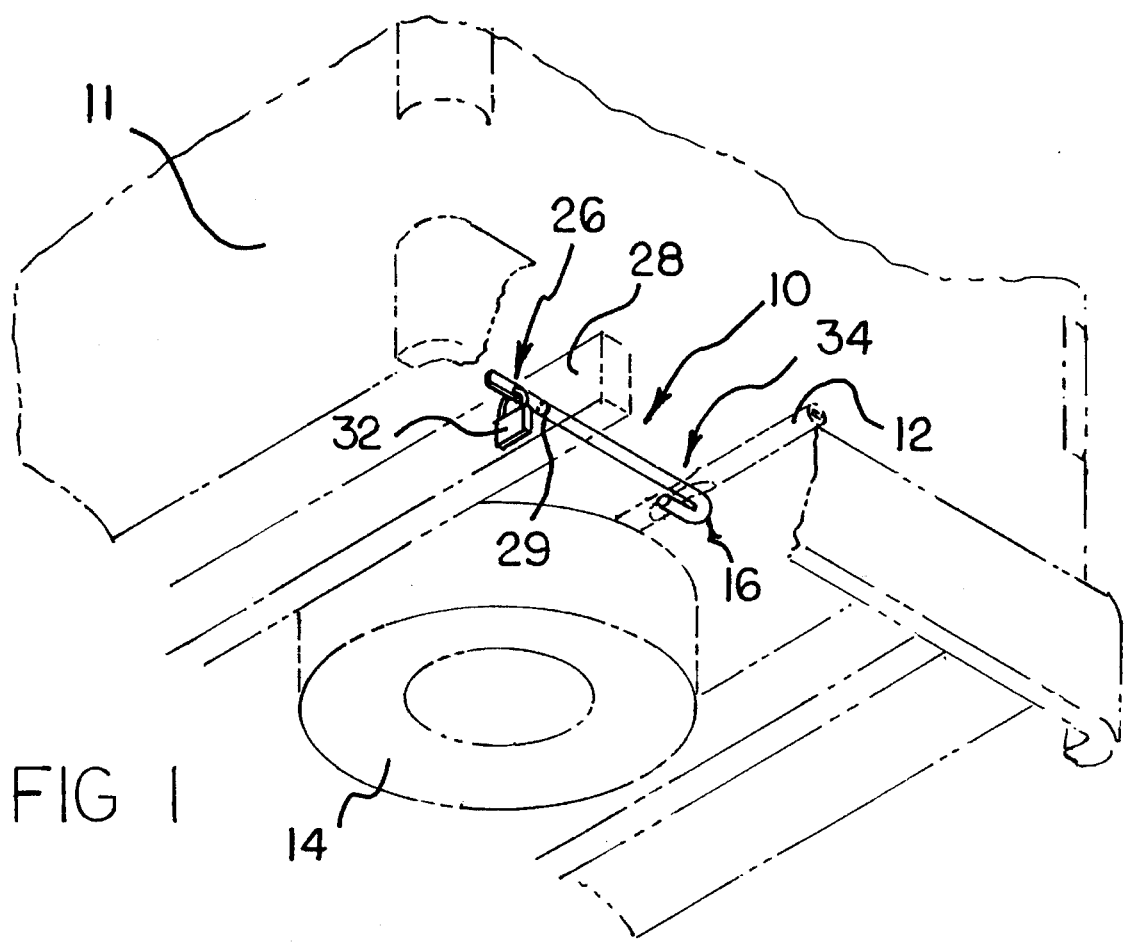
FIG. 1 is a perspective view showing a first preferred embodiment of the truck spare tire locking rod of the invention in position locking the spare tire retention assembly.
Figure 2:
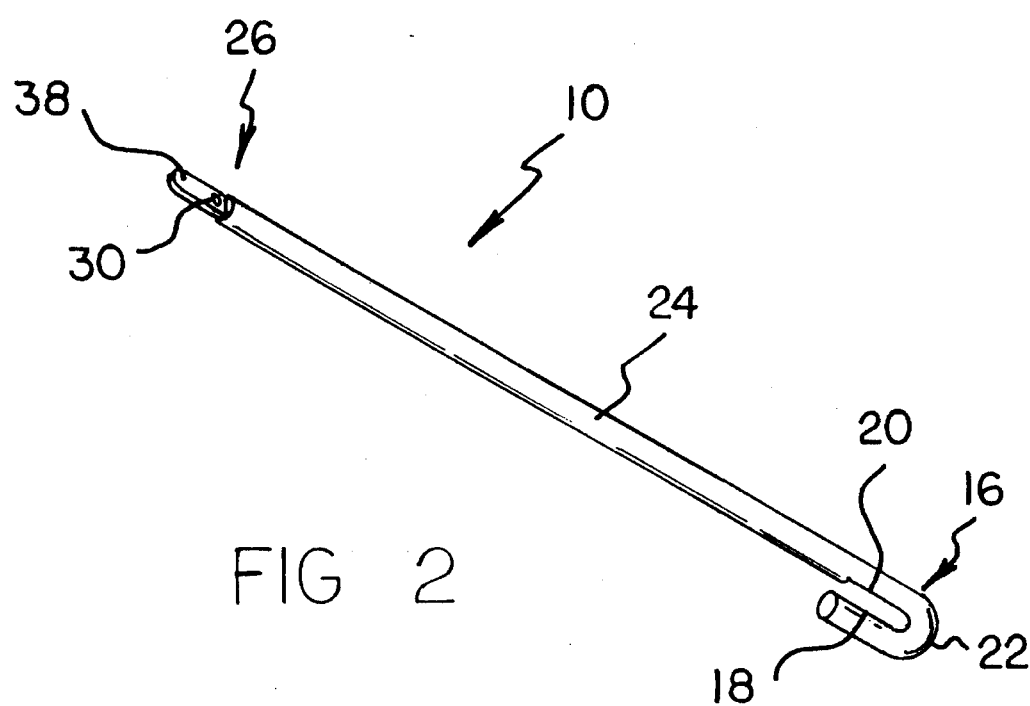
FIG. 2 is an enlarged perspective view of the embodiment of the truck spare tire locking rod shown in FIG. 1.
Figure 3:
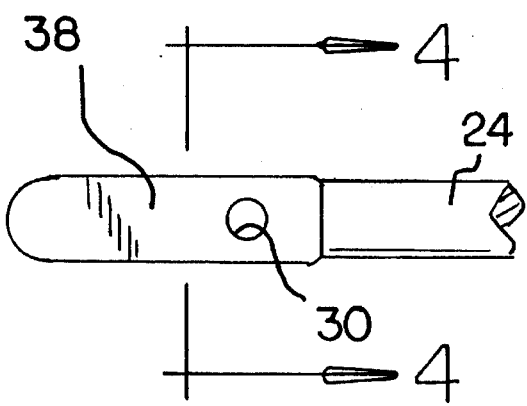
FIG. 3 is an enlarged side view, partially broken away, of the embodiment of the truck spare tire locking rod of the invention shown in FIG. 2.
Figure 3:
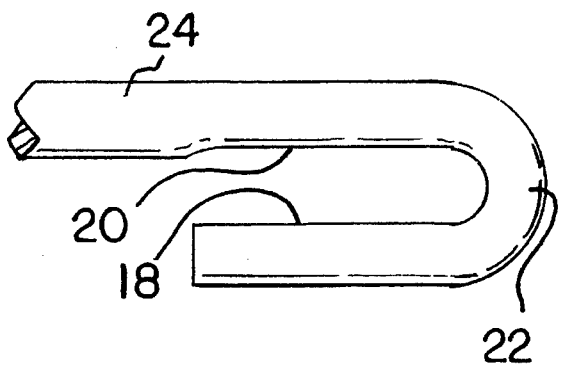
Figure 4:
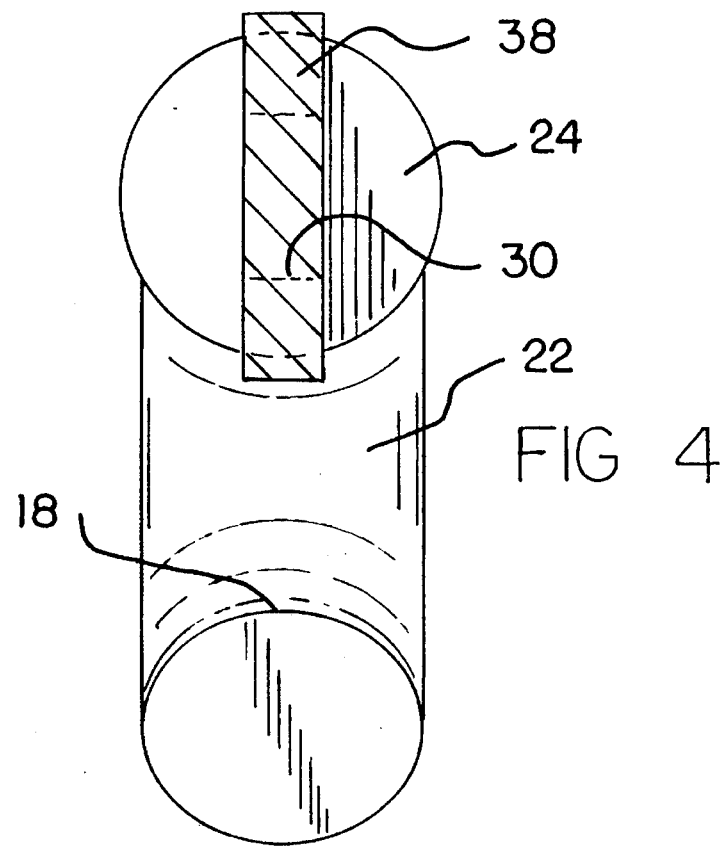
FIG. 4 is an enlarged front view of the embodiment of the invention shown in FIG. 3 taken along line 4—4 of FIG. 3.

Turning initially to FIGS. 1–4, there is shown a first exemplary embodiment of the track spare tire locking rod of the invention generally designated by reference numeral 10. In its preferred form, the truck spare tire locking rod 10 is for a truck 11 and prevents rotation of a rotatable shaft 12 which controls motion of a hoisting assembly for lifting and lowering the spare tire 14. The apparatus includes a first end assembly 16 which includes a first noncircular inner portion 18 and a second noncircular inner portion 20 that is connected to the first noncircular inner portion 18. A midportion 24 is connected to the first end assembly 16. The midportion 24 is adapted to be connected to a fixed portion 28 of the truck 11. A second end assembly 26 is connected to the midportion 24. The second end assembly 26 includes a lock-receiving portion 30 which is capable of receiving a lock assembly 32 for preventing the midportion 24 from being disconnected from the fixed portion 28 of the truck 11. The lock-receiving portion 30 is positioned sufficiently close to the fixed portion 28 of the truck 11 so that the first end assembly 16 of the apparatus will not slip off of the rotatable shaft 12. The first noncircular inner portion 18 of the first end assembly 16 is connected to the second noncircular inner portion 20 of the first end assembly 16 by a curved connection member 22 whereby the first end assembly 16 is in the form of a U-shaped structure.

The rotatable shaft 12 includes a noncircular portion 34 adapted to be straddled by the first end assembly 16. The noncircular portion 34 of the rotatable shaft 12 includes fiat planar surfaces. If fiat planar surfaces are not already present on the rotatable shaft 12, than the fiat planar surfaces can be provided. Either round portions of the rotatable shaft 12 can be filed or ground to be fiat, or a clamp which has flat planar outer surfaces can be damped onto the rotatable shaft 12. The first noncircular inner portion 18 and the second noncircular inner portion 20 of the first end assembly 16 include flat planar surfaces which fit adjacent to complementary fiat planar surfaces of the noncircular portion 34 of the rotatable shaft 12. The midportion 24 of the apparatus is in the form of a straight shaft.

The lock-receiving portion 30 is an aperture 30 located in the second end assembly 26 of the apparatus. The fixed portion 28 of the truck 11 is a frame member 28 of the truck 11. The frame member 28 includes an aperture 29 through which the second end assembly 26 and a portion of the midportion 24 extend. If an existing aperture 29 is present in the fixed portion 28, the existing aperture can be used. Otherwise, an aperture 29 can be drilled into the frame member 28. The lock assembly 32 is comprised of a padlock assembly 32.

The first noncircular inner portion 18 and the second noncircular inner portion 20 of the first end assembly 16 are adapted to straddle the noncircular portion 34 of the rotatable shaft 12. When the noncircular portion 34 of the rotatable shaft 12 is straddled by the noncircular inner portions of the first end assembly 16, the rotatable shaft 12 is prevented from being rotated. When the rotatable shaft 12 is prevented from being rotated, the spare tire 14 cannot be raised or lowered and cannot be stolen.

The truck spare tire locking rod 10 of the invention can be provided in a variety of colors, but an inconspicuous color is recommended. The truck spare tire locking rod 10 of the invention can be made from a wide variety of materials, but steel rod material is preferred.

The components of the truck spare tire locking rod of the invention can be made from inexpensive and durable metal materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved truck spare tire locking rod that is low in cost, relatively simple in design and operation, and which may advantageously be used to prevent unauthorized use of a spare tire retention device and prevents theft of the spare tire. With the invention, a truck spare tire locking rod is provided which utilizes a stationary portion of the truck to help arrest motion of the rotatable shaft which is used to raise and lower the spare tire retention assembly. With the invention, a truck spare tire locking rod is provided which employs a portable padlock for providing security against theft of the spare tire. With the invention, a truck spare tire locking rod is provided which is simple in structure and includes no moving parts.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A new and improved spare tire locking apparatus for a truck for preventing motion of a hoisting assembly for lifting and lowering a spare tire, said apparatus comprising:

a rotatable shaft for controlling motion of the hoisting assembly for the spare tire, a first end assembly which includes a first noncircular inner portion and a second noncircular inner portion connected to said first noncircular inner portion, a midportion connected to said first end assembly, said midportion adapted to be connected to a fixed portion of the truck, and a second end assembly connected to said midportion, said second end assembly including a lock-receiving portion which is capable of receiving a lock assembly for preventing said midportion from being disconnected from the fixed portion of the truck, wherein said lock-receiving portion is an aperture located in said second end assembly, wherein said midportion is in a form of a straight shaft, wherein said first noncircular inner portion of said first end assembly is connected to said second noncircular inner portion of said first end assembly by a curved connection member, and wherein said rotatable shaft includes a noncircular portion adapted to be straddled by said first noncircular inner portion and said second noncircular inner portion of said first end assembly.

2. The apparatus described in claim 1 wherein said noncircular portion of the rotatable shaft includes flat planar surfaces.

3. The apparatus described in claim 1 wherein said first noncircular inner portion and said second noncircular inner portion of said first end assembly include flat planar surfaces.

4. The apparatus deserted in claim 1 wherein the fixed portion of the truck is a frame member of the truck.

5. The apparatus described in claim 1 wherein said lock assembly is comprised of a padlock assembly.

6. A new and improved spare tire locking apparatus for a truck for preventing motion of a hoisting assembly for lifting and lowering a spare tire, said apparatus comprising:

a rotatable shaft for controlling motion of the hoisting assembly for the spare tire, wherein said rotatable shaft includes a pair of opposed outwardly-facing flat planar surfaces, a first end assembly which includes a first flat inner portion and a second flat inner portion connected to said first flat inner portion, a curved connection member for connecting said first flat inner portion and said second flat inner portion of said first end assembly together, wherein said outwardly-facing flat portions of said rotatable shaft are adapted to be straddled by and placed in registration with said first flat inner portion and said second flat inner portion of said first end assembly, for preventing rotation of said rotatable shaft, a straight shaft midportion connected to said first end assembly, said midportion adapted to be connected to a fixed portion of the truck, and a second end assembly connected to said midportion, said second end assembly including a lock-receiving aperture which is capable of receiving a lock assembly for preventing said midportion from being disconnected from the fixed portion of the truck.

* * * * *